Dec. 16, 1941. H. W. UHLRIG 2,266,101
ATTACHMENT FOR ELECTRIC APPLIANCES
Filed May 15, 1940
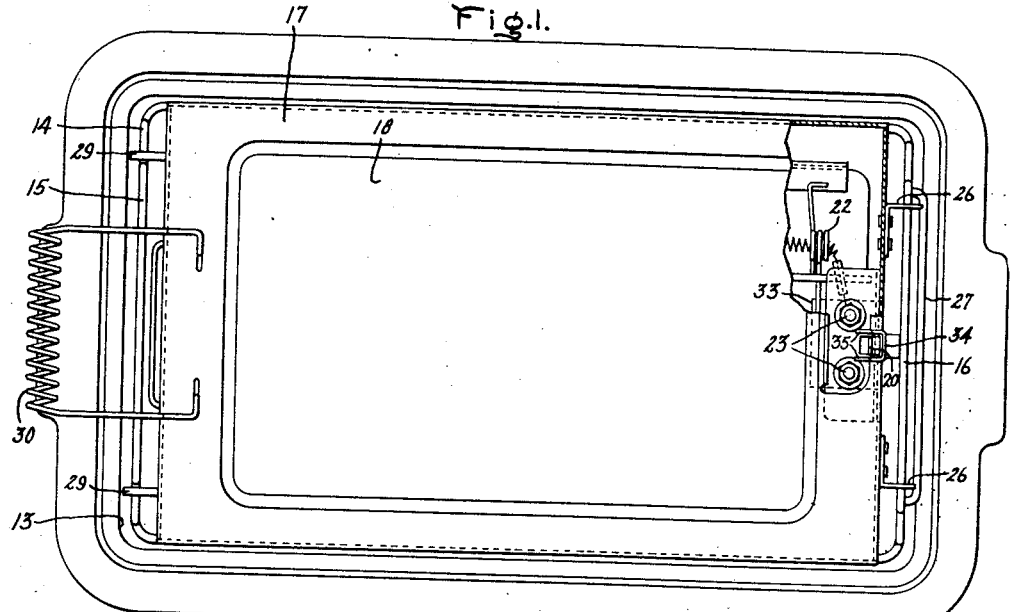
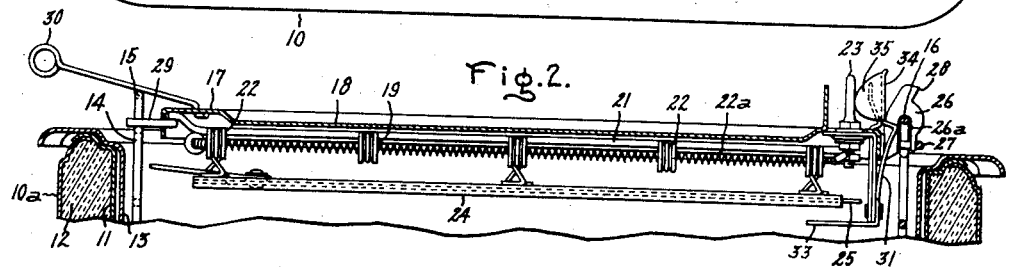
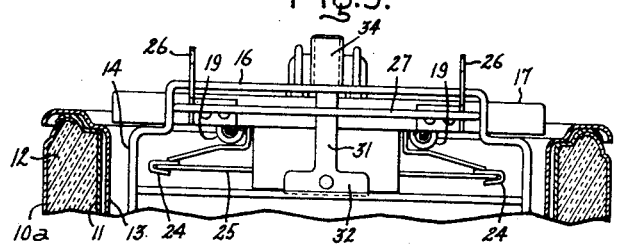
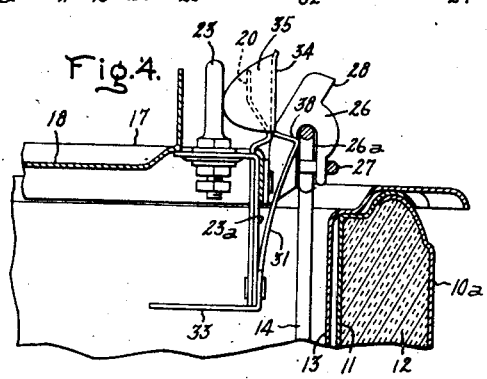
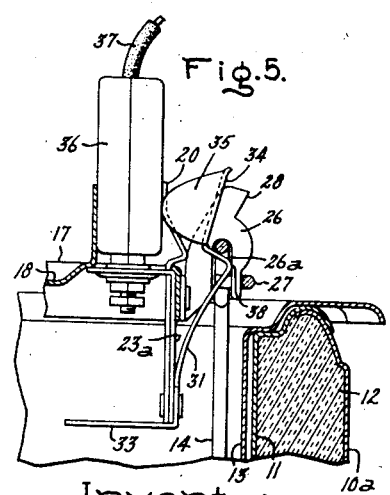
Inventor:
Harry W. Uhlrig,
by Harry E. Dunham
His Attorney.

Patented Dec. 16, 1941

2,266,101

UNITED STATES PATENT OFFICE 2,266,101

ATTACHMENT FOR ELECTRIC APPLIANCES

Harry W. Uhlrig, Stratford, Conn., assignor to General Electric Company, a corporation of New York Application May 15, 1940, Serial No. 335,302

10 Claims. (Cl. 219—35)

My invention relates to an attachment for an electric appliance and more particularly to a broiler-griddle attachment for an electric roaster or the like and has for its object the provision of new and improved means for latching the attachment to its support whenever the attachment is connected to a source of supply.

It has been customary to provide an electric appliance such as an electric roaster with a removable broiler-griddle attachment which is mounted on the food supporting rack positioned in the roaster well or otherwise pivotally mounted on the roaster casing. The broiler-griddle attachment usually comprises a frame in the form of a cooking surface upon and below which is mounted an electric heating unit. During griddle or frying operations the heating unit heats the cooking surface and during broiling operations the under side of the cooking surface acts as a reflector for directing the heat downwardly against the edible being broiled. With attachments of this type which have been provided in the past it has been possible to remove the attachment from its support while the heating unit thereof is still connected to the source of supply. This gives rise to a distinct fire hazard for it is possible for the housewife to remove the attachment and inadvertently set it on the table, floor or other combustible support without first disconnecting it from its source of supply.

It is the principal object of this invention to provide an attachment for an electric appliance with new and improved means for positively latching the attachment to its support so long as the heating unit of the attachment is connected to the source of supply.

It is a more specific object of this invention to provide a broiler-griddle attachment with a latching arrangement which is automatically moved to the latching position upon the connection of the heating unit of the attachment to a source of supply, and is automatically returned to the non-latching position so as to permit removal of the attachment from its support upon disconnection of the heating unit from its source of supply.

It is a further specific object of this invention to provide a new and improved latch arrangement which is simple in construction and may be manufactured at low cost.

For a more complete understanding of this invention, reference should be had to the accompanying drawing in which Fig. 1 is a plan view partly broken away of a broiler-griddle attachment provided with my improved latch arrangement and constructed so as to be mounted upon the rack located within the well of an electric roaster; Fig. 2 is a partial elevation partly in section of the arrangement shown in Fig. 1; Fig. 3 is an end elevation partly in section of the latch end of the arrangement shown in Fig. 1; Fig. 4 is an enlarged partial elevation of the arrangement shown in Fig. 2 showing more clearly certain details of my improved latch arrangement and showing the latch in the non-latching position; and Fig. 5 is a view similar to Fig. 4 showing the latch in its latching position.

Referring more particularly to the drawing, 10 represents an electric roaster having an outer shell 10a and an inner lining 11 between which is located a layer 12 of some suitable insulating material such as rock wool. The inner liner defines a roaster well in which is located a removable sheet metal well 13 which can be readily removed from the roaster for cleaning purposes after broiling or baking operations have been performed. Supported within the removable well 13 is a food supporting rack 14 having a pair of handles 15 and 16 which are adapted to extend above the top surface of the roaster casing.

Pivotally mounted on the handle 16 of the food supporting rack is a broiler-griddle attachment which is preferably of the type described and claimed in my copending application, Serial No. 312,528, filed January 5, 1940, and assigned to the assignee of this invention. Briefly, this attachment comprises a frame 17 having a cooking surface 18 formed therein. Detachably secured to the frame 17 is a heating unit assembly 19 which is removably latched to the frame 17 by means of a spring latch 20 (see Figs. 4 and 5). As described in my copending application, the heating unit assembly comprises a pair of longitudinally extending bars 21 from which is suspended a plurality insulators 22 which support a heating unit 22a, the ends of which are connected to a pair of terminal pins 23 which are firmly secured to the L-shaped end plate 23a so as to project above the surface of the frame 17 adjacent the hinged end thereof. Also suspended from the bars 21 is a pair of track members 24 which support a removable reflector plate 25. When the attachment is being used as a griddle, the reflector plate is in the position shown in Figs. 2 and 3 and when the attachment is used for broiling purposes the reflector plate 25 is removed from the unit.

Secured to one end of the frame 17 is a pair of hinge members 26 having elongated slots 26a which are arranged to engage the upper portion of the handle 16 of the rack 14. The hinge members 26 are constructed so that when the attachment is in a substantially horizontal position it may be readily removed from the rack. A second bar 27, is provided on the handle 16 so as to limit the rotational movement of the broiler-griddle attachment. This bar 27 is adapted to be engaged by the projection 28 provided on each of the hinge members and when the two are in engagement the attachment is supported in a substantially vertical position. The opposite end of the broiler-griddle attachment is supported on the rack adjacent the handle 15 by means of a pair of projecting pins 29 and provided at this end of the attachment is a handle 30 by which the attachment may be raised.

Since broiler griddle attachments of the type described above are more or less auxiliary equipment for an electric roaster, it is desirable to have them constructed and arranged so that they may be readily mounted on or removed from the supporting means provided therefor on or in the electric roaster. It is for this reason that the hinge members 26 are constructed so as to be readily removable from the handle 16. However, while it is desirable to have the attachment thus removable, this gives rise to a fire hazard, particularly if the attachment should be removed while it is still connected to its source of supply. As previously pointed out, this invention relates primarily to the provision of latching means for locking the broiler-griddle attachment to its supporting means so that it cannot be removed therefrom so long as the heating unit therefor is connected to its source of supply.

In accordance with the preferred form of my invention, the latch means comprises a resilient arm 31 having a T-shaped base portion 32 which is riveted or otherwise secured to the end plate 23a. Integrally formed on the base portion 32 and extending inwardly therefrom is a substantially horizontal plate portion 33 which serves to prevent accidental short circuiting of the bottom ends of the terminal pins 23. Provided at the upper end of the resilient arm is a substantially U-shaped head portion 34 with legs 35 which project inwardly toward the contact pins 23. As shown in Figs. 3–5, the legs 35 are adapted to span the latch bar 20 and to lie between the terminal pins 23. Each leg is sufficiently long so that the end thereof lies substantially on the imaginary line drawn normal to the outer periphery of both pins. With the legs 35 thus positioned, they are adapted to be engaged by the outer surface of the plug 36 of a suitable cord set 37 and be pressed outwardly thereby upon the insertion of the plug 36 upon the terminals 23 when connecting the heating element 22a to a source of supply (not shown). This outward movement of the resilient arm during the "plugging in" operation is utilized to latch the attachment to its support for the resilient arm 31 is bent intermediate its ends to form a detent 38 which, in the embodiment of my invention shown, is adapted to be forced under the top horizontal bar of the handle 16.

Considering the operation of my improved latching arrangement, the resilient arm 31 is normally in the position shown in Fig. 4. In this position it will be observed that the detent portion 38 lies to the left of the handle 16 so that it does not in any way interfere with the mounting or removal of the attachment from the supporting rack. However, when the plug 36 is inserted on the terminal prongs 23 so as to connect the attachment to a source of supply, the side wall of the plug engages the leg members 35 and forces the resilient arm 31 outwardly so that the detent 38 is forced under the handle 16. In this position the detent 38 functions in conjunction with the hinge members 26 to latch the attachment positively on the supporting rack in all positions of the attachment relative to the rack. Thus, while the plug 36 is connected to the terminal pins 23, the attachment cannot be removed from its support.

From the foregoing it will be apparent that I have provided improved means for latching a broiler-griddle attachment to its support so long as the heating element of the attachment is connected to a source of supply. It is to be particularly observed that my improved latching arrangement is automatic in operation and does not depend upon any selection or choice on the part of the operator. It is also to be observed that the latching means is simple in construction and may be readily and inexpensively applied to any particular broiler-griddle attachment. By means of my invention the danger from fire due to inadvertently removing and setting the broiler-griddle attachment on a combustible surface while it is still connected to its source of supply is eliminated.

While I have shown my improved latching arrangement as applied to a broiler-griddle attachment of the type described and claimed in my aforementioned copending application, it will be understood that the latching arrangement could be used with other types of attachments. Moreover, while I have shown my improved latch arrangement as applied to a broiler-griddle attachment which is supported on the auxiliary rack provided with an electric roaster, it is to be understood that this showing is merely for the purposes of illustration for my improved latch could be readily used with attachments which are removably and hingedly mounted on other parts of an electric roaster. In particular, it could be readily used with attachments which are removably hinged directly on the casing of an electric appliance instead of on an auxiliary rack as shown in the drawing.

Therefore, while I have disclosed one modification and application of my improved latching arrangement, it will be understood that many other modifications could be made therein and applications made thereof, and I intend in the appended claims to cover all such modifications and applications as are within the true spirit and scope of my invention.

What I claim as new and desire to secure by Letters Patent of the United States is:

1. An electrical attachment for use with an electric appliance comprising a frame, heating means supported on said frame, means connecting said heating means to a source of supply, means for removably hinging said frame on said appliance, latch means mounted on said frame and movable to cooperate with said hinging means to latch said frame on said appliance without interfering with the hinging of said frame on said appliance, and means for actuating said latch means to its latching position in accordance with the actuation of said connecting means so that said frame is non-removably supported on said appliance when said heating means are connected to a source of supply.

2. A broiler-griddle attachment for an electric roaster having a cooking well, comprising a rack adapted to be supported in said well, a frame, means for removably supporting said frame on said rack, a heating unit mounted on said frame, connector means for connecting said heating unit to a source of supply, latch means mounted on said frame adapted to engage said rack to prevent removal of said frame from said rack, and means for actuating said latch means in accordance with the movement of said connector means so that said frame is latched to said rack so long as said connector means are positioned to connect said heating unit to a source of supply.

3. A heating attachment for an electric appliance comprising a frame, means for removably supporting said frame on said appliance, a heating unit supported in said frame, terminal means connected to said heating unit, connector means adapted to engage said terminal means to connect said heating unit to a source of supply, latch means movable to one position to cooperate with said supporting means to prevent removal of said frame from said appliance, and means for moving said latch means to said one position in accordance with the engagement of said connector means with said terminal means so that removal of said frame from said appliance is prevented so long as said connector means and said terminal means are in engagement to connect said heating unit to a source of supply.

4. An attachment for an electrical appliance comprising a support adapted to be mounted on said appliance, a frame, means for removably mounting said frame on said support, heating means on said frame, terminal pins projecting through said frame and electrically connected to said heating means, a connector plug adapted to be received on said terminal pins to connect said heating means to a source of supply, a resilient member mounted near said terminal pins, a projection on said resilient member adapted to engage said support to prevent removal of said frame from said support, and means on said resilient means adapted to be engaged by said connector plug to move said resilient means so that said projection is moved into engagement with said support whereby said frame is latched to said support so long as said connector plug is in engagement with said terminal means.

5. An attachment for an electric roaster having a cooking well comprising a rack adapted to be positioned in said well, a frame, heating means supported on said frame, terminal pins connected to said heating means, hinge members mounted on one end of said frame for removably hinging said frame on said rack, latching means mounted on said frame adjacent said hinge member for latching said frame onto said rack, said latching means having a normally non-latching position in which said frame may be readily removed from said rack and a latching position in which it engages a portion of said rack and cooperates with said hinge means to prevent removal of said frame from said rack, and means for causing movement of said latching means from its normally non-latching position to its latching position in accordance with the connecting of said terminal pin to a source of supply so that removal of said frame from said rack while said heating means are energized is prevented.

6. In an attachment for an electric roaster having a cooking well and a rack within said well, a frame, means for hinging one end of said frame on said rack, a heating unit mounted on said frame, terminal pins for making an electrical connection to said heating unit, a resilient member mounted on the hinged end of said frame, a detent in said resilient member arranged to cooperate with said hinge means to latch said frame on said rack when said resilient member is pressed outwardly, and a projection on said resilient arm lying adjacent said terminal pins so as to be engaged by an electrical connector received on said terminal pins so that said detent is moved outwardly to the latching position when said heating means is connected to a source of supply.

7. In an attachment for an electric roaster having a cooking well and a rack within said well, a frame, hinge members mounted on one end of said frame for removably hinging said frame to said rack, a heating unit mounted on said frame, terminal pins connected to said heating unit and projecting above said frame adjacent the hinged end thereof, plug means adapted to engage said terminal pins to connect said heating unit to a source of supply, a resilient member mounted on the hinged end of said frame and having a projecting portion lying adjacent said terminal pins so that upon engagement of said terminal pins by said plug means said resilient member is forced outwardly, and a detent in said resilient member engaging said rack when said resilient member is forced outwardly so as to prevent removal of said frame from said rack when said plug is connected to said terminal members.

8. An attachment adapted to be removably supported on an electric appliance comprising a frame, supporting means for removably supporting said frame on said appliance, heating means mounted on said frame, terminal means connected to said heating means, a plug received by said terminal means for connecting said heating means to a source of supply, latch means mounted on said frame and adapted to cooperate with said supporting means to latch said frame in its supported position on said appliance, a projection on said latch means lying adjacent said terminal means so as to be engaged by said plug when said plug is mounted on said terminal means, said engagement between said projection and said plug causing said latch means to be moved to the latching position to prevent removal of said frame from said appliance when said heating means is connected to a source of supply.

9. A broiler-griddle attachment for an electric roaster comprising a supporting member, a frame member, means for removably mounting said frame member on said supporting member, heating means supported in said frame member, terminal means connected to said heating means, connector means adapted to engage said terminal means to connect said heating means to a source of supply, latch means mounted on one of said members and movable to a position to engage the other of said members to prevent removal of said frame member from said supporting member, and means for actuating said latch means in accordance with the engagement of said connector means with said terminal means so that removal of said frame member from said support is prevented so long as said connector means and said terminal means are in engagement to connect said heating means to a source of supply.

10. A broiler-griddle attachment for an electric roaster having a cooking well comprising a supporting rack adapted to be positioned within said well, a frame, separable hinge means for removably hinging said frame on said rack, heating means supported in said frame, terminal means connected to said heating means, connector means adapted to engage said terminal means to connect said heating means to a source of supply, latch means mounted on said frame and movable to a position to engage said rack to prevent separation of said hinge means and removal of said frame from said rack, and means for actuating said latch means to said one position in accordance with engagement of said connector means with said terminal means so that removal of said frame from said rack is prevented so long as said connector means and said terminal means are in engagement to connect said heating means to a source of supply.

HARRY W. UHLRIG.